United States Patent
Cherukuri et al.

(10) Patent No.: US 9,794,349 B2
(45) Date of Patent: *Oct. 17, 2017

(54) DYNAMICALLY MODULATING LINK WIDTH

(71) Applicant: Intel Corporation, Santa Clara, CA (US)

(72) Inventors: Naveen Cherukuri, San Jose, CA (US); Aaron T. Spink, San Francisco, CA (US); Phanindra Mannava, Folsom, CA (US); Tim Frodsham, Portland, OR (US); Jeffrey R. Wilcox, Folsom, CA (US); Sanjay Dabral, Palo Alto, CA (US); David Dunning, Portland, OR (US); Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/554,513

(22) Filed: Nov. 26, 2014

(65) Prior Publication Data

US 2015/0081921 A1    Mar. 19, 2015

Related U.S. Application Data

(63) Continuation of application No. 13/240,546, filed on Sep. 22, 2011, now Pat. No. 8,914,541, which is a (Continued)

(51) Int. Cl.
| | |
|---|---|
| *H04L 29/08* | (2006.01) |
| *G06F 13/42* | (2006.01) |
| *H04L 29/06* | (2006.01) |

(52) U.S. Cl.
CPC ........ *H04L 67/141* (2013.01); *G06F 13/4265* (2013.01); *H04L 65/60* (2013.01); *Y02B 60/1228* (2013.01); *Y02B 60/1235* (2013.01)

(58) Field of Classification Search
CPC ... G06F 13/4265; H04L 65/60; H04L 67/141; Y02B 60/1228; Y02B 60/1235
(Continued)

(56) References Cited

U.S. PATENT DOCUMENTS

| | | |
|---|---|---|
| 5,396,635 A | 3/1995 | Fung |
| 5,781,784 A | 7/1998 | McKinley |

(Continued)

FOREIGN PATENT DOCUMENTS

| | | |
|---|---|---|
| EP | 1599006 A1 | 11/2005 |
| JP | 04-359335 | 11/1992 |

(Continued)

OTHER PUBLICATIONS

Soteriou et al. Dynamic Power Management for Power Optimization of Interconnection Networks Using On/Off Links. IEEE 2003.*

(Continued)

*Primary Examiner* — Bryan Lee
(74) *Attorney, Agent, or Firm* — Trop, Pruner & Hu, P.C.

(57) ABSTRACT

Systems and methods of managing a link provide for receiving a remote width capability during a link initialization, the remote width capability corresponding to a remote port. A link between a local port and the remote port is operated at a plurality of link widths in accordance with the remote width capability.

16 Claims, 4 Drawing Sheets

Related U.S. Application Data continuation of application No. 10/850,851, filed on May 21, 2004, now Pat. No. 8,046,488.

(58) Field of Classification Search
USPC .................................................. 709/228
See application file for complete search history.

(56) References Cited

U.S. PATENT DOCUMENTS

| | | | |
|---|---|---|---|
| 6,009,488 | A | 12/1999 | Kavipurapu .............. 710/105 |
| 6,222,825 | B1 | 4/2001 | Mangin et al. |
| 6,484,223 | B1 | 11/2002 | Lenz |
| 6,526,469 | B1 | 2/2003 | Drehmel et al. |
| 6,665,742 | B2 | 12/2003 | Owen et al. .................. 710/10 |
| 7,136,953 | B1* | 11/2006 | Bisson ............. G06F 13/4018 710/29 |
| 7,188,263 | B1* | 3/2007 | Rubinstein ......... G06F 1/3209 713/300 |
| 7,313,712 | B2 | 12/2007 | Cherukuri et al. |
| 7,418,005 | B2 | 8/2008 | Arima |
| 7,660,261 | B2 | 2/2010 | Keromytis et al. |
| 7,844,767 | B2 | 11/2010 | Cherukuri et al. |
| 2002/0075854 | A1* | 6/2002 | Kumar ............. H04Q 11/0005 370/352 |
| 2002/0087716 | A1 | 7/2002 | Mustafa |
| 2002/0103945 | A1 | 8/2002 | Owen et al. |
| 2002/0172164 | A1 | 11/2002 | Chou et al. |
| 2003/0088799 | A1 | 5/2003 | Bodas |
| 2003/0185308 | A1 | 10/2003 | Schoenborn |
| 2003/0221026 | A1* | 11/2003 | Newman ............. H04L 29/06 710/8 |
| 2004/0098475 | A1 | 5/2004 | Zeitler et al. |
| 2004/0128576 | A1 | 7/2004 | Gutman et al. |
| 2004/0153952 | A1 | 8/2004 | Sharma et al. |
| 2004/0264466 | A1 | 12/2004 | Huang |
| 2005/0027876 | A1* | 2/2005 | Umei ................... H04L 12/42 709/231 |
| 2005/0188232 | A1 | 8/2005 | Weng et al. |
| 2005/0259599 | A1 | 11/2005 | Cherukuri et al. |
| 2005/0259696 | A1 | 11/2005 | Steinman et al. |
| 2005/0262284 | A1 | 11/2005 | Cherukuri et al. |
| 2006/0015761 | A1 | 1/2006 | Kwa et al. |

FOREIGN PATENT DOCUMENTS

| | | |
|---|---|---|
| JP | 08-22338 | 2/1995 |
| JP | 2000-261435 | 3/1999 |
| JP | 2001-022690 | 7/1999 |
| JP | 2002-259327 | 9/2002 |
| JP | 2003-037613 | 7/2003 |

OTHER PUBLICATIONS

European Search Report dated Sep. 7, 2005 from European Patent Application No. 04255079.8.
European Office Action dated Sep. 6, 2006 from European Patent Application No. 04255079.8-1237, 10 pgs.
English Language Translation of an Office Action of JPO dated Jan. 29, 2008, pp. 1-4.
European Office Action dated Mar. 19, 2007 from the European Patent Application No. 04255079.8-1237, pp. 1-4.
European Patent Office, Summons to attend oral proceedings pursuant to Rule 115(1) EPC, dated Nov. 28, 2008, pp. 1-5.
Chinese Patent and Trademark Office, First Office Action dated Nov. 28, 2008 in related foreign patent application.
Japanese Patent and Trademark Office, Notification of Reasons for Rejection dated Feb. 3, 2009, in related foreign application.
PCI Express Base Specification, Revision 1.0, Jul. 22, 2002, pp. 1-8 and 165-189.
PCT/US2006/024193, International Search Report And Written Opinion For Case P21365PCT Mailed Feb. 1, 2007, 11 Pages.
German Patent and Trademark Office, Office Action dated Oct. 29, 2008 in related application.
Reply to Office Action Mailed Dec. 24, 2008 filed in the USPTO on Mar. 30, 2009 in U.S. Appl. No. 11/155,857 (pp. 1-10).
State Intellectual Property Office of the People's Republic of China, Second Office Action dated Jun. 19, 2009, in a related application.
Japanese Patent Office, Final Rejection Decision dated Oct. 27, 2009, in related Japanese patent application No. 2004-235926.

* cited by examiner

DYNAMICALLY MODULATING LINK WIDTH

This application is a continuation of U.S. patent application Ser. No. 13/240,546, filed Sep. 22, 2011, which is a continuation of U.S. patent application Ser. No. 10/850,851, filed May 21, 2004, now U.S. Pat. No. 8,046,488, issued Oct. 25, 2011, the content of which is hereby incorporated by reference.

The present application is related to the U.S. patent application Ser. No. 10/850,733, filed May 21, 2004 entitled "Link Power Saving State" by N. Cherukuri, et al., and the U.S. patent application Ser. No. 10/851,925, filed May 21, 2004 entitled "A Method for Identifying Bad Lanes and Exchanging Width Capabilities of Two Agents Connected Across a Link" by N. Cherukuri, et al.

BACKGROUND

Technical Field

Embodiments of the present invention generally relate to link management. More particularly, embodiments relate to dynamic modulation of link widths.

Discussion

Modern day computer systems are made up of many components that communicate with one another for various reasons. For example, in multi-processor systems, one processor may access the memory of another processor in order to retrieve data that is required locally, and vice versa. In another example, a processor may communicate with a chipset in order to exchange data with an input/output (I/O) device coupled to an I/O hub of the chipset.

The links that interconnect computer components provide a mechanism for transferring data and each point-to-point link is typically made up of a plurality of "lanes", where each lane can transfer a bit of data in a given cycle. The number of lanes to be used during communication defines the link width, which effectively controls the bandwidth of the link. Simply put, wider links provide a larger bandwidth than narrower links. On the other hand, wider links tend to consume more power because of the additional circuitry necessary to support the additional lanes. The link width is typically negotiated during a lengthy initialization process and is relatively static once set under conventional approaches. While these approaches have been suitable under certain circumstances, there still remains considerable room for improvement.

In particular, it has been determined that the operating conditions of components often vary over time and that bandwidth requirements can vary in kind. For example, a processor may transition from running a thread that requires a relatively large amount of bandwidth for a link to running a thread that requires a relatively small amount of bandwidth for the link. The link width, however, typically does not change under conventional techniques because the initialization process is so complex and time consuming. As a result, the link may be wider than necessary.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
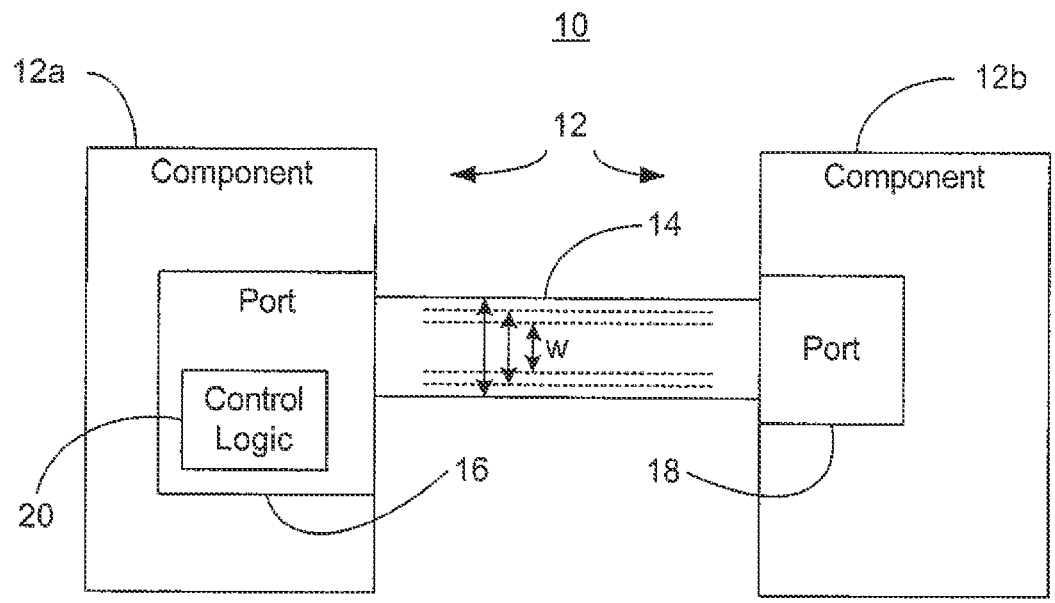
FIG. 1 is a block diagram of an example of a link having a dynamically modulated width according to one embodiment of the invention.

FIG. 1 shows a computer system 10 having a first component 12a and a second component 12b. The computer system 10 may be part of a desktop personal computer (PC), notebook PC, server, and so on, and typically includes many more components than the two shown. The illustrated example has therefore been simplified for the purposes of discussion, and the techniques described herein can be readily scaled to a large number of components. The components 12 (12a-12b) may include microprocessors, chipset input/output (I/O) hubs, graphics controllers, memory controllers, etc., or any combination thereof. The first component 12a has a port 16 coupled to a first end of a point-to-point link 14 and the second component 12b has a port 18 coupled to a second end of the link 14.

The link 14 may be a bidirectional link that carries data from the first component 12a to the second component 12b and from the second component 12b to the first component. The bidirectional link could be a simultaneous bidirectional (SBD) link in which data can flow in both directions of a single physical lane concurrently, or a shared bidirectional link in which data flows in one direction only, at any given time. Alternatively, the link 14 may be a unidirectional link that only carries data in one direction. In such a case, two links such as link 14 could be used to provide full two-way communication between the ports 16, 18. Simply put, while a number of the examples will be discussed with regard to one type of link, other types of links can be used without parting from the spirit and scope of the embodiments described herein. Notwithstanding, there are a number of aspects of unidirectional links for which the embodiments are well suited.

In the illustrated example, the port 16 has control logic 20 capable of modulating the width "w" of the link 14 based on various operating conditions. For example, when bandwidth requirements for data to be transferred over the link 14 are relatively low, the control logic 20 can reduce the width of the link 14 in order to conserve power. Likewise, if bandwidth requirements increase, the width of the link 14 can be increased to meet the requirements. Link width modulation can therefore take place "on the fly" without the need for additional link initializations or negotiations between the ports 16, 18. By enabling the port 16 to dynamically modulate link width, the system 10 can capitalize on power savings windows of opportunity that may be missed under conventional approaches. Simply put, by eliminating the need for link re-initialization, a real-time link modulation scheme can be achieved, which reduces the time required to modulate widths and provides substantial power savings. It should be noted that although the illustrated example shows only the port 16 of the first component 12a as having link modulation control logic, the port 18 of the second component 12b may also include control logic to modulate link width. Indeed, in a multi-node system having many interconnected components, each of the components can be equipped with the ability to dynamically modulate link width in order to provide full-scale power savings.

As already discussed, the link 14 can be bidirectional or unidirectional. In the case of a pair of unidirectional links, each unidirectional link could potentially operate at a different width, where the transmitting port selects the optimum link width based on local operating conditions. In the case of a bidirectional link, each direction of the link could operate at a different width. Such an approach provides the maximum amount of freedom in power reduction and represents a significant improvement over conventional techniques.

The link 14 can be partitioned into "quadrants" for the purposes of link width modulation. For example, if the link 14 is twenty bits wide, bits zero through four could be defined as quadrant one, bits five through nine could be defined as quadrant two, and so on. Thus, modulating to a narrower link width might involve deactivating the input/output (I/O) circuitry associated with one or more of the quadrants. Similarly, modulating to a wider link width might involve activating the I/O circuitry of one or more of the quadrants. The I/O circuitry is the physical portion of the port responsible for transmitting and/or receiving signals to/from the link. Other schemes could be used based on the desired tradeoff between granularity and complexity. For example, if complexity is not a significant issue, the link width could be modulated on a lane-by-lane basis without parting from the spirit and scope of the principles described herein.

Figure 7:
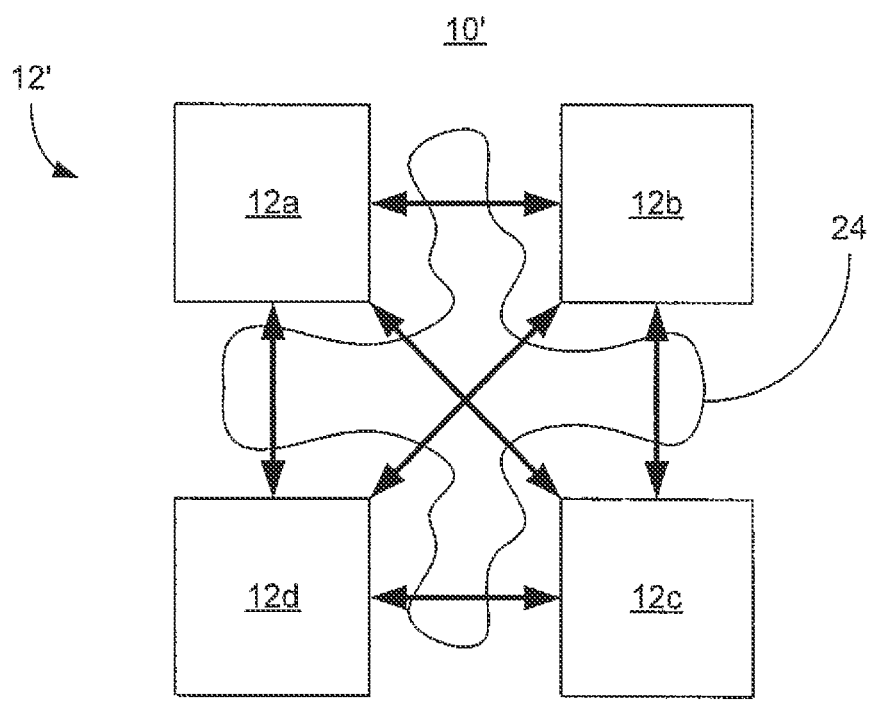
FIG. 7 is a block diagram of an example of a point-to-point network interconnect according to one embodiment of the invention.

As alluded to above, the link 14 can represent a portion of a point-to-point fabric, which interconnects all of the components in the computer system 10. An example of such a topology is shown in FIG. 7. In the illustrated embodiment, a computer system 10' includes a point-to-point network interconnect 24 that is coupled to components 12' (12a-12d). In the point-to-point fabric topology, each component has a direct link to other nodes in the system. The network interconnect 24 can also have a layered communication protocol in which link width modulation messages are constructed from "flits" at a link layer and transferred between components in packets at a protocol layer. A flit is essentially a unit of flow control at the link layer, where a flit includes multiple physical layer "phits" and multiple flits make up a protocol layer "packet". Other layers such as transport and routing layers can also be included in the hierarchy. Table I summarizes one approach to implementing the layered communication protocol.

TABLE I

| Layer | Description |
|---|---|
| Protocol | Higher level communication protocol between ports such as power management, cache coherence, ordering, peer to peer I/O, interrupt delivery, etc. (packets) |
| Transport | End-to-end reliable transmission between two ports |
| Routing | Flexible and distributed way to route packets from a source to a destination |
| Link | Reliable data transfer and flow control between two directly connected ports & virtualization of the physical channel (flits) |

TABLE I-continued

| Layer | Description |
|---|---|
| Physical | Electrical transfer of information between two directly connected ports (phits) |

The transport and routing layers may be needed for certain platform options only. In desktop/mobile and dual processor systems, for example, the functionality of the routing layer can be embedded in the link layer. Simply put, layers may be added or removed from the protocol without parting from the spirit and scope of the illustrated embodiments.

Figure 2:
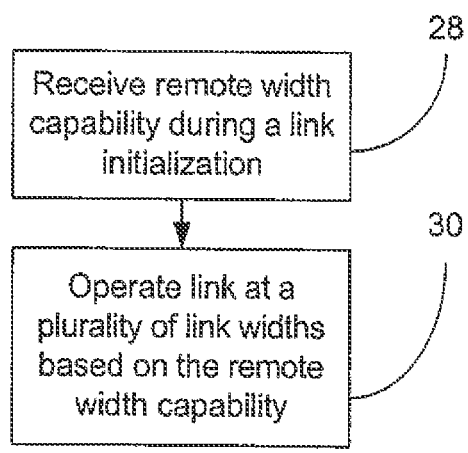
FIG. 2 is a flowchart of an example of a method of managing a link according to one embodiment of the invention.

Turning now to FIG. 2, a method 26 of managing a link is shown. The method 26 can be implemented in control logic of a port such as the control logic 20 (FIG. 1) discussed above, using any known hardware and/or software technique. Processing block 28 provides for receiving a remote width capability at a local port during a link initialization, where the remote width capability corresponds to a remote port. The link initialization process can involve a handshaking procedure in which the ports exchange training data to determine which lanes in the link are usable. In one example, the remote width capability includes supported link widths and corresponding lane identifiers. Thus, the remote width capability might identify various widths such as "full width", "half width" and "quarter width", as well as the quadrants to be used at these widths. The remote width capability can be communicated as part of a specialized training sequence.

The local port can compare the remote width capability to an internally generated or otherwise known local width capability and select a common link map (CLM) that both ports can support. Block 30 provides for operating a link between the local port and the remote port at a plurality of link widths in accordance with the remote width capability.

Figure 3:
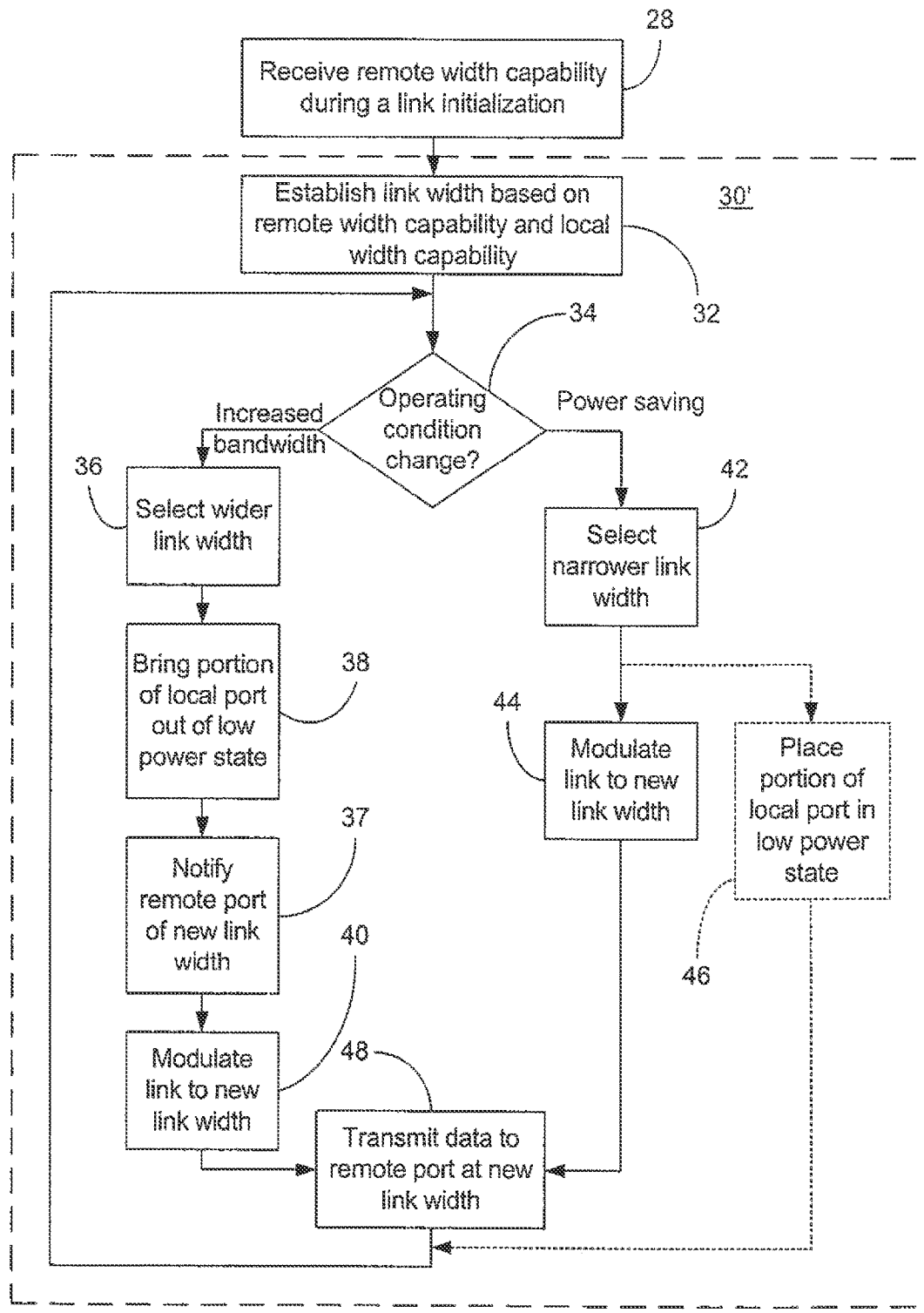
FIG. 3 is a flowchart of an example of a process of operating a link at a plurality of link widths according to one embodiment of the invention.

FIG. 3 shows one approach to operating a link at a plurality of link widths in greater detail at block 30'. In the illustrated example, a first link width is established at block 32 based on the remote width capability and the local width capability. Block 34 provides for determining whether a power saving opportunity is present or an increased bandwidth requirement exists. An increased bandwidth requirement might be associated with a relatively complex process such as streaming video, whereas a power saving opportunity may result from little or no anticipated activity on a link. If bandwidth needs to be increased, a wider link width is selected at block 36 based on the remote width capability.

Block 37 provides for notifying the remote port of the wider link width. The local port can then wait a predetermined amount of time (e.g., $T_{WAKE-UP}$), which ensures that the link layer of the remote port has had sufficient time to understand the notice and inform the physical layer of the remote port. Alternatively, a low power exit sequence that is self-contained at the physical layer can be used to power-up inactive lanes at both sides of the link. In such an approach, the power exit sequence can make use of a predetermined wake-up time (e.g., $T_{LOS\_WAKE}$), which is common to both ports and is programmed into the power management registers. Thus, expiration of the predetermined wake-up time provides notification for both sides of the link to become active.

The input/output (I/O) circuitry of the local port corresponding to the additional width is brought out of a low power state at block 38 and the link is modulated to the wider link width at block 40. It should be noted that bringing the I/O circuitry out of the low power state may take a considerable amount of time. In particular, the deeper the low power state, the longer it will take to exit the state (although the power savings will be greater). To minimize the effects of this latency, the low power state is exited at block 38 before modulating to the wider link width at block 40. Such an approach enables the link to be operated at the previous link width while the circuitry is powered-up in the background and significantly improves the link width modulation time. Furthermore, since the power-up process is performed in the background, the low power state can be designed to be deeper than normal, providing even greater power savings.

If a power saving opportunity is present, block 42 provides for selecting a narrower link width based on the remote width capability. The link is modulated to the narrower link width at block 44. The modulation at block 44 provides constructive notification of the narrower link width to the remote port. The portion of the local port corresponding to the surplus width is placed in the low power state at block 46. It should be noted that entering the low power state at block 46 can be conducted after modulating to the narrower link width at block 44 in order to avoid any latencies associated with the link circuitry deactivation process. Thus, the link is operated at the new link width as soon as possible, while the circuitry is powered-down in the background. Such an approach further improves the link width modulation time and facilitates the use of deeper low power states. Block 48 provides for transmitting data to the remote port at the second link width.

Figure 4:
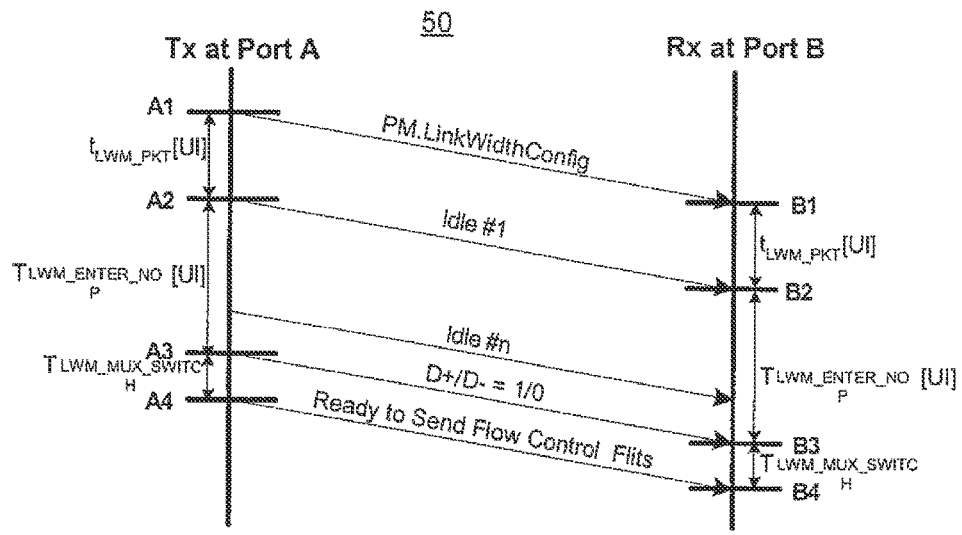
FIG. 4 is a messaging diagram of an example of a link width modulation according to one embodiment of the invention.

Turning now to FIG. 4, a messaging diagram 50 is shown in which a local port (Port A) modulates a link to a new link width. In the illustrated example, the local port notifies the remote port (Port B) of the pending transition by sending a "PM.LinkWidthConfig" packet to the remote port. The time parameter "$t_{LWM\_PKT}[UI]$" corresponds to the length of the notification packet and does not impact the link width modulation sequence. Once the notification packet is sent, the link layer of the local port sends idle flits "Idle #1–n" until the time period $T_{LWM\_ENTER\_NOP}[UI]$ has elapsed. This time period corresponds to the amount of time required for the remote port's link layer to relay the new link width to the physical layer of the remote port. The value can be stored in a power management register of the local port, where power management register values can be static or dynamic.

Static values can be hardcoded and do not change after power-on, where dynamic values can be updated for more aggressive timing. In the case of dynamic power management register timing values, a given link modulation sequence may use the most recently programmed values. For example, the basic input/output system (BIOS) can take into consideration the actual platform topology and program optimal values into the register. Examples of platform variables that could result in optimization are flight time across the link, internal delay between the link layer and the physical layer, etc.

After sending the required number of idle flits, the link layer of the local port signals the physical layer of the local port to adjust its multiplexers to support the new link width. The local physical layer drives a high/low signal (e.g., I/O) on all active transmit differential pairs (e.g., D+/D−) for the time period $T_{LWM\_MUX\_SWITCH}$, adjusted to the next flit boundary, using the new link width. It should be noted that the value 1/0 is used merely for the purposes of discussion and that alternative values can also be used. Indeed, due to the short duration of the period in question, the D+/D− transmission can be eliminated all together. This time period, which can also be stored to and read from the local power management register, corresponds to the amount of time required for the physical layer of either the remote port or the local port (whichever is greater) to complete multiplexer switching in support of the new link width. When the $T_{LWM\_MUX\_SWITCH}$ time period has elapsed, the local port is ready to send flow control flits. Thus, as both ports modulate link widths, the timing on both sides of the link can be controlled to a high level of precision and any modulation errors can be avoided.

Figure 5:
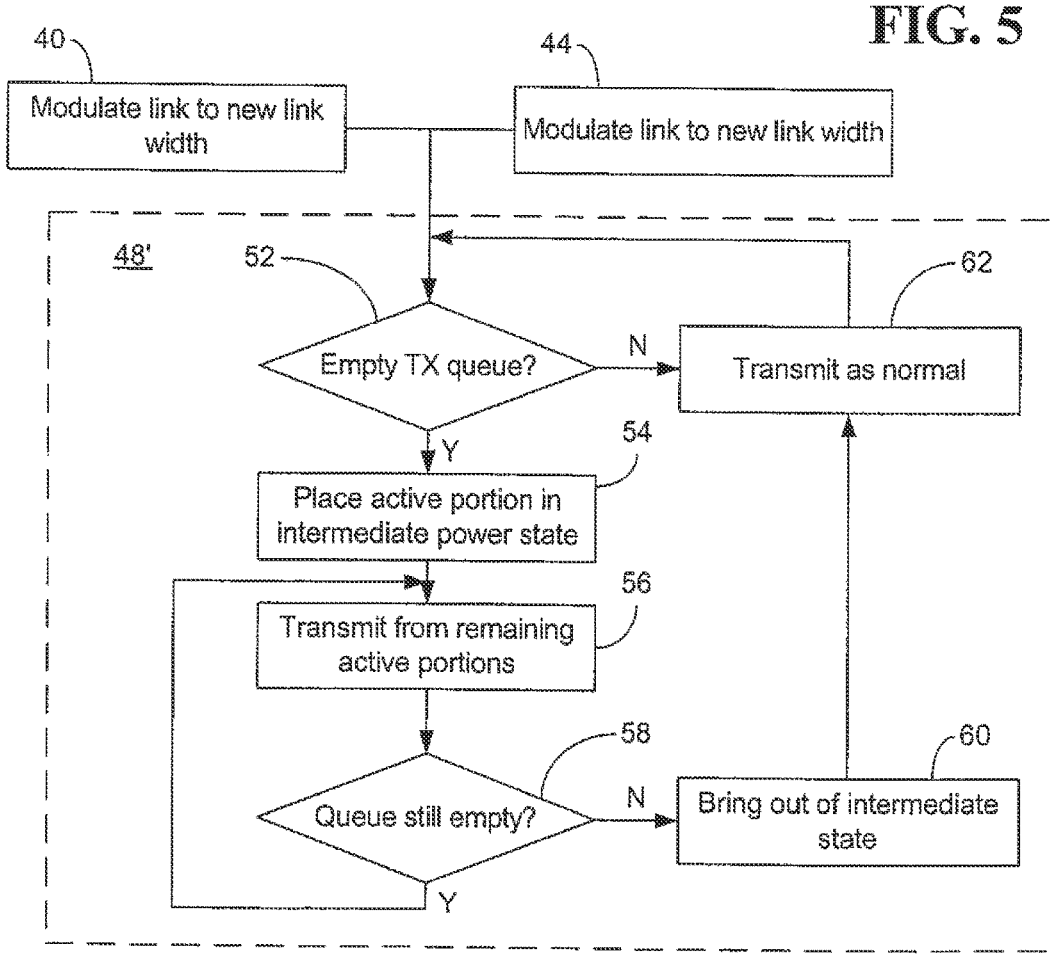
FIG. 5 is a flowchart of an example of a process of transmitting data at a modified link width according to one embodiment of the invention.

FIG. 5 shows one approach to transmitting data to a remote port in greater detail at block 48'. In the illustrated example, it is determined whether one or more transaction queues associated with an active part of the link are empty at block 52. In this regard, each port may have a physical layer transaction queue that stores data to be placed onto the link, where an empty transaction queue can signify an activated link that is not currently being used. The illustrated technique provides for additional power savings in such a case. In particular, if an empty transaction queue is detected, the active link portion of the local port is placed in an intermediate power state at block 54, where the intermediate power state has a relatively short reactivation latency/wake-up time in comparison to the unused portions of the link that are placed in the low power state. In one embodiment, the active link portion of the local port has a configurable wake-up time such that various elements of the I/O circuitry can be selectively powered down in order to meet the required minimum latency. In such a case, a longer allowable wake-up time enables a larger portion of the I/O circuitry to be turned off, resulting in higher power savings.

Thus, the portion of the link in the intermediate power state can be configured to wake-up faster than the portion of the link the low power state. Consider, for example, a link operating at full width where the local port decides to modulate the link width down to half width. The modulation can be implemented by placing half of the lanes in a low power state. If the local port then determines that one fourth of the active portion of the link is not currently being used, the link can be effectively modulated down to quarter width where one fourth of the lanes are placed in the intermediate power state. The modulation from quarter width to half width can therefore take place more quickly than the modulation from half width to full width.

Block 56 provides for transmitting data from the remaining active portions of the local port and block 58 provides for detecting data in the transaction queue. If the queue is no longer empty, the link circuitry in question is brought out of the intermediate power state at block 60. As already noted, block 60 may be completed more quickly than block 38 (FIG. 3) discussed above. Block 62 provides for transmitting data on all active lanes as normal.

Figure 6:
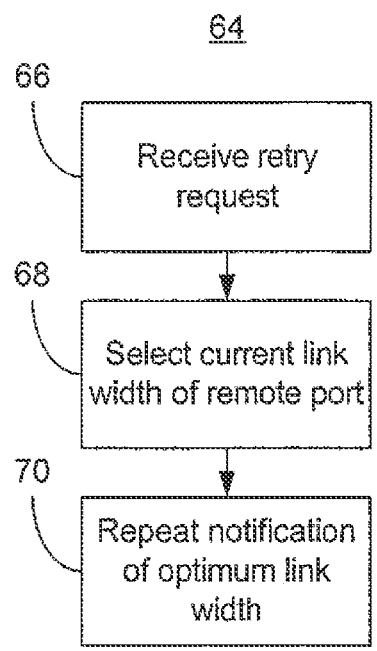
FIG. 6 is a flowchart of an example of a process of managing link transmission errors according to one embodiment of the invention.

Turning now to FIG. 6, a method 64 of detecting errors is shown. In particular, the method 64 can be incorporated into the method 26 (FIG. 2) discussed above as needed to eliminate any negative impact that may be associated with a "negotiation-less" link modulation process. In particular, block 66 provides for receiving a retry request from a remote port, where the retry request indicates that a link width notification message contained errors and indicates a current link width of the remote port. The current link width of the remote port is selected for the local port at block 68 and the notification is repeated at block 70.

The above techniques therefore enable the pursuit of aggressive power saving options in areas such as mobile computing, where power conservation is crucial. For example, implementing the dynamic link width modulation in notebook computers provides improvements that include, but are not limited to, extended battery life, smaller form factors and reduced operating costs.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
a hardware local port having control logic to receive from a remote port a remote width capability during a link initialization, the remote width capability of the remote port and including a plurality of supported link widths, compare the remote width capability to a local width capability of the local port, select a common link map that the remote port and the local port can support, and operate a link between the local port and the remote port at a plurality of link widths in accordance with the remote width capability, wherein the control logic is to establish a first link width for the link based on the remote width capability and the local width capability, select a second link width narrower than the first link width based on the remote width capability and a power saving condition of the local port and modulate the link to the second link width, place a portion of the local port in a low power state after the link modulation to the second link width, and transmit data to the remote port at the second link width after the modulation of the link to the second link width if a predetermined amount of time has elapsed after notification of the second link width to the remote port, wherein the predetermined amount of time includes a first period corresponding to an amount of time for a link layer of the remote port to relay the second link width to a physical layer of the remote port and a second period corresponding to an amount of time for the physical layer of the remote port to complete multiplexer switching in support of the second link width.

2. The apparatus of claim 1, wherein the control logic is to bring a portion of the local port out of the low power state before modulation of the link to a third link width wider than the first link width responsive to an increased bandwidth condition.

3. The apparatus of claim 1, wherein each of the plurality of link widths is a different bit width.

4. The apparatus of claim 1, wherein the link comprises a point-to-point link.

5. The apparatus of claim 1, wherein the link comprises a bidirectional link, wherein the link is to operate at different link widths in each direction.

6. The apparatus of claim 1, wherein the control logic is to establish a third link width wider than the first link width responsive to streaming video.

7. The apparatus of claim 1, wherein the hardware local port comprises a power management register.

8. The apparatus of claim 1, wherein the control logic is to send a link width configuration packet to the remote port, and thereafter to send a plurality of idle flits until the predetermined amount of time has elapsed.

9. A method comprising:
receiving from a remote port a remote width capability of the remote port during a link initialization, the remote width capability including a plurality of supported link widths;
comparing the remote width capability to a local width capability of a local port;
selecting a common link map that the remote port and the local port can support;
operating a link between the local port and the remote port at a plurality of link widths in accordance with the remote width capability without an additional link initialization or negotiation between the local port and the remote port, including establishing a first link width for the link based on the remote width capability and the local width capability, selecting a second link width to be narrower than the first link width based on the remote width capability and a power saving condition of the local port, and modulating the link to the second link width and placing a portion of the local port in a low power state after modulating the link to the second link width, and based on an increased bandwidth requirement, selecting a third link width to be wider than the first link width, and bringing a portion of the local port out of the low power state and modulating the link to the third link width;
transmitting data to the remote port at the second link width after the modulation of the link to the second link width if a predetermined amount of time has elapsed after the remote port has been notified of the second link width;
receiving a retry request from the remote port, the retry request indicating that a message associated with the modulating contained errors, the retry request including a current link width of the remote port;
selecting the current link width of the remote port for the local port; and
repeating the modulating the link to the second link width.

10. The method of claim 9, further including placing an active portion of the local port in an intermediate power state responsive to a determination of an empty transaction queue of the active portion, the intermediate power state having a smaller reactivation latency time than the low power state.

11. The method of claim 9, wherein the predetermined amount of time includes an amount of time for a link layer of the remote port to relay the second link width to a physical layer of the remote port.

12. The method of claim 11, wherein the predetermined amount of time includes an amount of time for the physical layer of the remote port to complete multiplexer switching in support of the second link width.

13. The method of claim 9, further comprising sending idle messages to the remote port after notifying the remote port of the second link width, and thereafter driving a predetermined signal on the link of the second link width until an end of the predetermined amount of time.

14. The method of claim 9, further including:
detecting an empty transaction queue associated with an active portion of the local port; and
placing the active portion in an intermediate power state, the intermediate power state having a relatively short reactivation latency.

15. A system comprising:
a remote port;
a link coupled to the remote port; and
a local port coupled to the link, the local port including control logic to receive from the remote port training data of a training sequence including a remote width capability of the remote port during a link initialization, compare the remote width capability to a local width capability of the local port, and select a common link map that the remote port and the local port can support and operate the link at a plurality of link widths based on the common link map, wherein the control logic is to establish a first link width for the link and select a second link width responsive to an operating condition change of the local port, modulate the link to the second link width, thereafter detect an empty transaction queue of the local port associated with an active part of the link, and based on the determination of the empty transaction queue, place an active link portion of the local port in an intermediate power state, wherein a reactivation latency time of the intermediate power state is smaller than a reactivation latency time of a low power state, wherein the control logic is further to transmit data to the remote port at the second link width after a predetermined amount of time has elapsed after the remote port has been notified of the second link width, wherein the predetermined amount of time includes a first period corresponding to an amount of time for a link layer of the remote port to relay the second link width to a physical layer of the remote port and a second period corresponding to an amount of time for the physical layer of the remote port to complete multiplexer switching in support of the second link width.

16. The system of claim 15, wherein the control logic is to place a portion of the local port in the low power state after modulating the link to the second link width.

* * * * *